(12) United States Patent
Harman

(10) Patent No.: US 12,584,552 B2
(45) Date of Patent: Mar. 24, 2026

(54) ELLIPTICAL DRIVE

(71) Applicant: CONN-WELD INDUSTRIES, LLC, Princeton, WV (US)

(72) Inventor: Gregory K. Harman, Princeton, WV (US)

(73) Assignee: CONN-WELD INDUSTRIES, LLC, Princeton, WV (US)

( * ) Notice: Subject to any disclaimer, the term of this patent is extended or adjusted under 35 U.S.C. 154(b) by 0 days.

(21) Appl. No.: 18/845,473

(22) PCT Filed: Mar. 10, 2023

(86) PCT No.: PCT/US2023/014956
§ 371 (c)(1),
(2) Date: Sep. 10, 2024

(87) PCT Pub. No.: WO2023/172725
PCT Pub. Date: Sep. 14, 2023

(65) Prior Publication Data
US 2025/0198495 A1 Jun. 19, 2025

Related U.S. Application Data

(60) Provisional application No. 63/318,813, filed on Mar. 11, 2022.

(51) Int. Cl.
*F16H 57/023* (2012.01)
*B07B 1/42* (2006.01)
(Continued)

(52) U.S. Cl.
CPC ............. *F16H 57/023* (2013.01); *F16H 1/20* (2013.01); *F16H 7/02* (2013.01); *F16H 7/06* (2013.01); *F16H 57/0031* (2013.01); *B07B 1/42* (2013.01)

(58) Field of Classification Search
CPC .. B07B 1/42; B65G 27/20; F16H 7/06; F16H 7/02; F16H 57/023; F16H 57/0031; F16H 1/20
See application file for complete search history.

(56) References Cited

U.S. PATENT DOCUMENTS 2,410,170 A 10/1946 Lazan
3,878,733 A 4/1975 Tertinek
(Continued)

OTHER PUBLICATIONS

International Search Report of PCT/US2023/014956 dated Jun. 27, 2023.
Supplementary European Search Report dated Jan. 30, 2026.

*Primary Examiner* — Jake Cook
(74) *Attorney, Agent, or Firm* — Mattingly & Malur, PC

(57) ABSTRACT

In some examples, an elliptical drive adjusts a phase angle of unbalanced shafts or weights of a vibrating screen. The elliptical drive may include a yoke assembly including four plates that allows relative rotation of two shafts that in turn adjust the phase angle. One of the two shafts may have a pulley drive driven by a motor. The elliptical drive may include two gears intermeshed with each other hand having respective hubs with helical splines that mate with corresponding helical splines of the two shafts. Rotating an actuator rod may cause the two gears to move in an axial direction of the two shafts thereby rotating the two shafts relative to one another which in turn causes a phase angle adjustment of the unbalanced weights or shafts of the vibration mechanism of the vibrating screen.

20 Claims, 9 Drawing Sheets

(51) Int. Cl.
  *F16H 1/20* (2006.01)
  *F16H 7/02* (2006.01)
  *F16H 7/06* (2006.01)
  *F16H 57/00* (2012.01)

(56) References Cited

U.S. PATENT DOCUMENTS

| | | | | |
|---|---|---|---|---|
| 4,412,757 A * | 11/1983 | Kummel | ................ | E02D 3/074 |
| | | | | 74/61 |
| 5,177,386 A * | 1/1993 | Shimada | ................ | B06B 1/166 |
| | | | | 74/61 |
| 10,569,304 B2 * | 2/2020 | Bellec | .................... | B06B 1/161 |
| 2013/0055835 A1 | 3/2013 | Schmidt | | |
| 2018/0161818 A1 | 6/2018 | Kwak et al. | | |
| 2021/0332548 A1 | 10/2021 | Wolfrum et al. | | |

* cited by examiner

ELLIPTICAL DRIVE

This application claims the benefit of U.S. Provisional Application No. 63/318,813 filed Mar. 11, 2022.

TECHNICAL FIELD

This disclosure relates to the technical field of mineral processing.

BACKGROUND

In some instances, vibrating screens are used in mineral processing to separate the desired material or minerals from the feed. The feed pass over the vibrating screen, which is vibrated by an elliptical vibrating mechanism. The elliptical vibrating mechanism may be driven by an elliptical drive. The ability to adjust the elliptical vibrating mechanism to obtain a desired motion is advantageous to obtain the desired material, as explained below.

In some examples, the elliptical motion is created by rotating two or more unbalanced shafts, weights or other unbalanced mechanisms in opposite directions. The unbalanced weights may have different masses. For example, varying the phase angle of the unbalanced weights causes the angle of motion of the elliptical vibrating mechanism to change. Being able to adjust the phase angle is therefore desirable for vibration screens in mineral processing. Adjusting the phase angle may be achieved using a yoke assembly mechanism, as described below.

In prior machines, the driving or linking mechanism would have to be mechanically disassembled and reassembled many times in a trial-and-error attempt to achieve a desired elliptical motion. In the present invention, for example, a crank handle may be turned to dynamically adjust the motion while observing throw cards in a throw card test, for example, that indicate the motion achieved via the adjustment. Further, some prior machines allow for adjustment while in operation, but those machines rely on multiple motors running at different speeds. The adjustments to the elliptical movement in the present invention may be totally mechanical which offers benefits of simplicity and minimizes sensitive electrical components in a very harsh environment. Also, in some implementations, the elliptical drive may be mounted beside the vibrating screen and can be adjusted while the elliptical drive is running to obtain the desired motion.

An additional benefit of the present invention is the ability to easily remove the stored kinetic energy inherent in these types of machines due to the unbalanced shafts (or mechanisms or weights) of the vibrating screen for maintenance purposes. For example, if a drive belt is to be removed in a fixed position unit, as in prior machines, the unbalanced weight could be in a loaded or cocked position and if the belt is removed the weights would fall creating a dangerous condition. In some embodiments of the current invention, the weights can easily be adjusted via the crank handle to a neutral weight position thereby removing the stored kinetic energy before anything is removed for safer maintenance work.

SUMMARY

Some implementations include an elliptical drive device, which includes a first shaft having first helical external splines, a second shaft, disposed parallel to the first shaft, having second helical external splines, a first gear having a first hub with first helical internal splines that mate with the first helical external splines of the first shaft, a second gear intermeshed with the first gear and having a second hub with second helical internal splines that mate with the second helical external splines of the second shaft, a first drive shaft coupled to the first shaft, a third shaft disposed parallel to the second shaft, a second drive shaft, disposed parallel to the first drive shaft, coupled to the third shaft, a belt connecting the second shaft with the third shaft, a top plate disposed above the first gear and the second gear, a first threaded actuator rod disposed through the top plate, a front plate and a back plate sandwiching the first gear and the second gear in an axial direction of the first shaft and second shaft, and a bottom plate sandwiching the first gear and the second gear with the top plate in a vertical direction that is orthogonal to the axial direction. In some examples, upon rotation of the first threaded actuator rod, the top plate, bottom plate, front plate and back plate move together in the axial direction causing relative rotation of the first shaft and second shaft with respect to each other.

BRIEF DESCRIPTION OF THE DRAWINGS

The detailed description is set forth with reference to the accompanying figures. The use of the same reference numbers in different figures indicates similar or identical items or features.

DESCRIPTION OF THE EMBODIMENTS

Some implementations herein are directed to techniques and arrangements for adjusting a phase angle of weights or shafts of a vibrating screen to obtain a desired elliptical motion of elliptical vibration mechanism of the vibrating screen. In some implementations, intermeshed gears each having helical internal splines disposed in the hub of the gear mate with helical external splines of respective shafts. The shafts are coupled to respective drive shafts, which are coupled to unbalanced shafts, weights or other unbalanced mechanisms that drive the elliptical driving mechanism of the vibration screen. The gears are mounted on an yolk assembly allowing axial movement of the yolk assembly and gears along the shafts. By turning a crank handle, the yolk assembly moves in an axial direction (i.e., z direction) along the shafts. The movement of the gears along the shafts causes the drive shafts to rotate by the engagement of the helical internal splines and helical external splines, thereby effecting the timing or phase angle of the unbalanced shafts or other unbalanced mechanisms (or weights).

Figure 1:
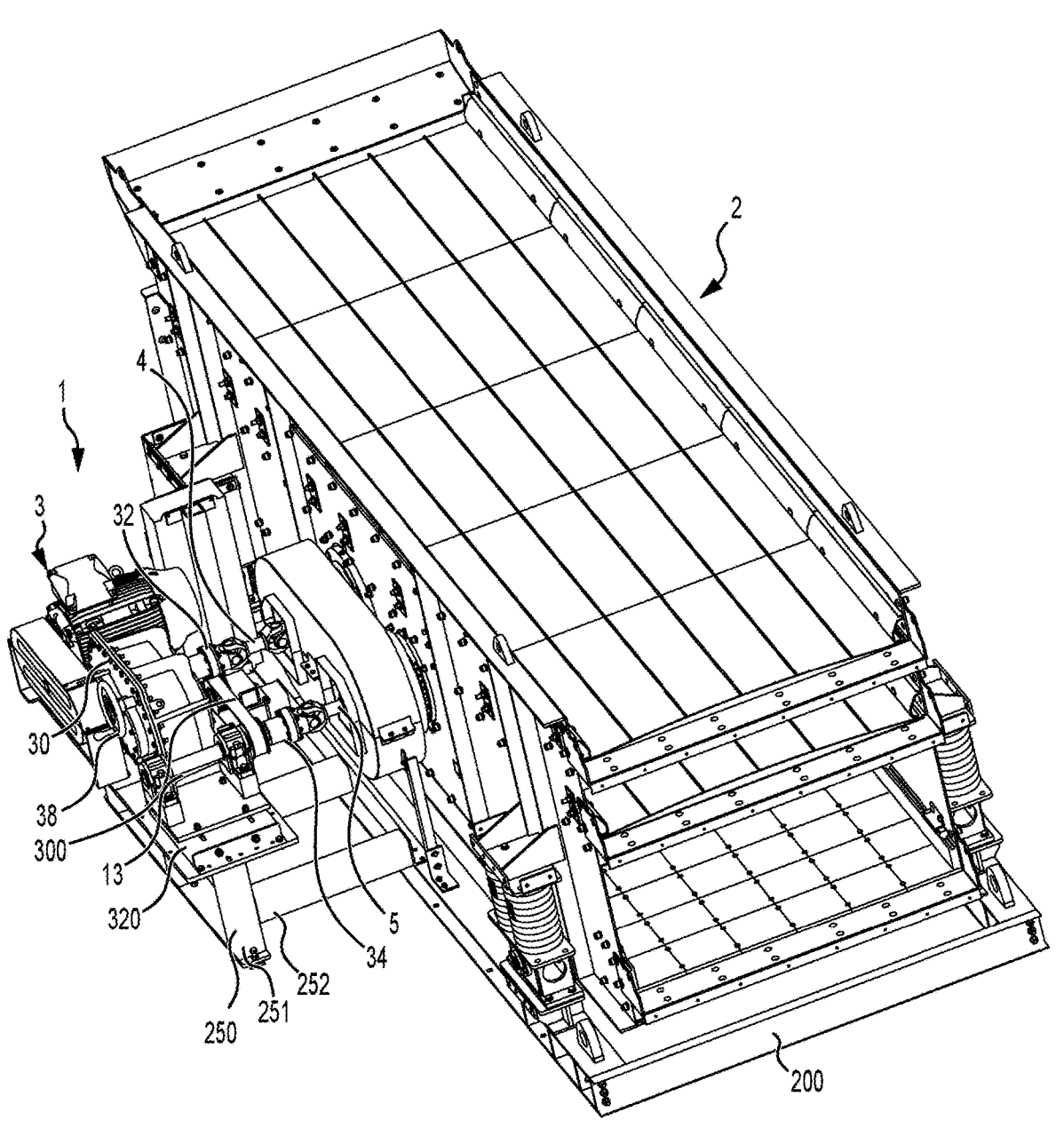
FIG. 1 illustrates an example of an elliptical drive and a vibrating screen according to some implementations.

FIG. 1 illustrates an example of an elliptical drive 1 and a vibrating screen 2 according to some implementations. For example, rotation of unbalanced shafts, weights or other unbalanced mechanisms of the vibrating screen 2 is achieved by rotating shafts of the elliptical drive 1. A drive motor 3 drives a first gear 6 and a second gear 10 that are intermeshed with each other. The first gear 6 is disposed on a first shaft 8 and the second gear 10 is disposed on a second shaft 12, which are disposed in the housing 30.

In some examples, the first shaft 8 is coupled to a first drive shaft 4 via a first coupling 32. The output of the first shaft 8 is connected to an unbalanced shaft or weight of the vibrating screen by the first drive shaft 4 and first coupling 32. In some examples, one or more shafts or couplings may be disposed between the first drive shaft 4 and the unbalanced shaft or weights. Further, in some examples, the output of the second shaft 12 is transferred to a third shaft 13 (i.e, jack shaft) via a belt 300. The third shaft 13 is coupled to a second drive shaft 5 via a second coupling 34. In turn, the output of the third shaft 13 is connected to an unbalanced shaft or weight of the vibrating screen by the second drive shaft 5 and second coupling 34. Likewise, in some examples, one or more shafts or couplings may be disposed between the second drive shaft 5 and the unbalanced shaft or weights.

In some implementations, the elliptical drive 1 is mounted externally or outside of the vibrating screen 2. Vibrating screen 2 has a base 200 and the elliptical drive 1 may have a base 250. In some examples, the base 250 of the elliptical drive 1 is independent and not connected to the base of the vibrating screen 200. In other examples, the base 250 of the elliptical drive 1 is attached or connected to the base of the vibrating screen 200. The attachment or connection may be implemented using rivets, bolts, or screws, as examples. Further, the base 250 of the elliptical drive 1 may have vertical legs 251 supporting the elliptical drive 1 above the ground or working surface. The base 250 of the elliptical drive 1 may also include support structures 252 extending toward the base of the vibrating screen 200, and in some examples, attaching or connecting to the base of the vibrating screen 200.

Figure 2:
FIG. 2 illustrates an exploded view of the elliptical drive according to some implementations.

FIG. 2 illustrates an exploded view of the elliptical drive 1 according to some implementations. In some examples, the elliptical drive 1 includes a yolk assembly 50, which includes a first gear 6 disposed on a first shaft 8 and a second gear 10 disposed on a second shaft 12, which are disposed in the housing 30. In some examples the yoke assembly may be referred to as a phase angle adjustment device. The first gear 6 and second gear 10 may rotate within an oil bath within the housing 30. Additionally, the first gear 6 and the second gear 10 may have 13 inch diameters and may be of the same size (e.g., width and diameter).

In some examples, helical internal splines 14 are disposed in the inner surface of bore or hub 16 of the first gear 6. The hub 16 having the internal splines 14 may extend outwardly in the axial (Z) direction beyond a front face 15 of the first gear 6 and beyond a rear face 17 of the first gear 6 in the axial direction. The helical internal splines 14 may mate or mesh with helical external splines 18 disposed on a helical section 20 of the first shaft 8. In some examples a length of the helical section 20 of the first shaft in the axial direction is longer than an axial length of the hub 16. A first front bearing 100 may be disposed around a portion of an outer surface of the hub 16 that extends outwardly beyond the front face 15 of the first gear 6. A first rear bearing 102 may be disposed around a portion of an outer surface of the hub 16 that extends outwardly beyond the rear face 17 of the first gear 6. Further, face plate 36 may include a first bore 37 through which the first shaft 8 enters. FIG. 2 further shows a first rear seal plate 142 connected to the housing 30, which is explained in more detail below.

Further, in some examples, helical internal splines 22 are disposed in the bore or hub 24 of the second gear 10. The hub 24 having the internal splines 22 may extend outwardly in the axial (Z) direction beyond a front face 23 of the second gear 10 and beyond a rear face 25 of the second gear 10. The helical internal splines 22 may mate or mesh with helical external splines 26 disposed on a helical section 28 of the second shaft 12. In some examples a length of the helical section 28 of the second shaft 12 in the axial direction is longer than an axial length of the hub 24. A second front bearing 104 may be disposed around a portion of an outer surface of the hub 24 that extends outwardly beyond the front face 23 of the first gear 6. A second rear bearing 106 may be disposed around a portion of an outer surface of the hub 24 that extends outwardly beyond the rear face 25 of the second gear 10. In some examples, Multiple bearings may be disposed around the hubs 16, 24. Further, face plate 36 may include a second bore 35 through which the second shaft 12 enters.

The respective helical external splines 18, 26 of the first shaft 8 and second shaft 12 may be disposed in the respective helical sections 20, 28 along predetermined axial distances of the shafts 8, 12. In some examples, the first shaft 8 is approximately 28.5 inches overall but the helical splined section 20 is approximately 7.5 inches long and about 4.5 inch in diameter.

In some implementations, a drive pulley 9 is disposed one end of the first shaft 8. The drive pulley 9 may be disposed outside of a face plate 36 and may be driven by the drive motor 3. Using the drive pulley 9, the drive motor 3 drives (rotates) the first shaft 8. Rotation of the first shaft 8 by the drive motor 3 in turn causes rotation of the first drive shaft 4. The first shaft 8 in turn rotates the first gear 6 by the engagement of the helical splines 18 of the first shaft 8 with the helical internal splines 14 of the first gear 6. As the first gear 6 rotates the second gear 10 is caused to rotate (in the opposite direction). Rotation of the second gear 10 in turn causes the second shaft 12 to rotate by the engagement of the helical internal splines 22 of the second gear 10 with the helical external splines 26 of the second shaft 12. The second shaft 12 in turn drives belt 300 which engages with drive pulley 302 thereby rotating second drive shaft 5.

FIG. 2 further shows an yolk assembly 50. In some examples, the yolk assembly 50 is moveable in an axial directions of the first shaft 8 and second shaft 12. For example, as the yolk assembly 50 moves in the axial direction, the first gear 6 and the second gear 10 move along the respective axes of the first shaft 8 and the second shaft 12 with the yolk assembly 50. By moving the first gear 6 and the second gear 10 in the axial direction while the helical internal splines 14 (of first gear 6) are engaged with the helical external splines 18 (of first shaft 8) and while the helical internal splines 22 (of second gear 10) are engaged with the helical external splines 26 (of the second shaft 12), the respective drive shafts 4, 5 are rotated relative to one another. This in effect changes the timing or phase angle of the respective unbalanced shafts or weights (not shown) within the vibrating screen to each other. In some instances, this causes the major axis of the elliptical motion to move from the initial angle of vertical throw (e.g., 45 degrees) to an angle of horizontal throw (e.g., 0 degrees) and anywhere in between. This enhances the separation of the material going across the screen. Different types of material or composition of material benefit from more or less aggressive angle of motion or throw.

In some implementations, the yolk assembly 50 includes a front plate 60, back plate 70, top plate 80 and a bottom plate 90 among other elements, which are described below. For example, the front plate 60 and back plate 70 may sandwich the first gear 6 and the second gear 10 in the axial (Z) direction. The top plate 80 and the bottom plate 90 may sandwich the first gear 6 and the second gear 10 in the vertical (Y) direction. In some implementations, the front plate 60 and back plate 70 may be essentially a quadrilateral shape and may have a thickness in the Z direction.

In some implementations, the front plate 60 may have a first hole or bore 61 allowing portions of the first shaft 8 to pass through such as the helical section 20. The first hole 61 may engage with the first front bearing 100. Similarly, the front plate 60 may have a second hole or bore 62 allowing portions of the second shaft 12 to pass through such as the helical section 28. The second hole 62 may engage with the second front bearing 104. For example, the front plate 60 may be supported by the first front bearing 100 and second front bearing 104 disposed on the hub 16 of the first gear 6 and the hub 24 of the second front bearing 10, respectively. In some instances there may be a gap or clearance between the front face 15 of the first gear 6 and the front face 23 of the second gear 10 and a rear face 67 front plate 60.

Even further, in some implementations, the back plate 70 may have a first hole or bore 71 allowing portions of the first shaft 8 to pass through such as the helical section 20. The first bore 71 may engage with the first rear bearing 102. Similarly, the back plate 70 may also have a second hole or bore 72 allowing portions of the second shaft 12 to pass through such as the helical section 28. The second bore 72 may engage with the second rear bearing 106. For example, the back plate 70 may be supported by the first rear bearing 102 and second rear bearing 106 disposed on the hub 16 of the first gear 6 and the hub 24 of the second front bearing 10, respectively. In some instances there is a gap or clearance between the rear face 17 of the first gear 6 and the rear face 25 of the second gear 8 and a front face 75 of the back plate 70.

In some examples, the top plate 80 may have essentially a quadrilateral shape and is disposed above the first gear 6 and the second gear 10 in the vertical direction. Oil passages may be disposed in the top surface 81 of the top plate 80. The top plate 80 may also be of a predetermined width in the Z direction to maintain adequate spacing between the front plate 60 and back plate 70. A top surface 81 of the top plate 80 may be even or flush with a top surface 63 of the front plate 60 and a top surface 73 of the back plate 70.

Even further, in some examples the bottom plate 90 that may be in a quadrilateral shape and may be disposed below the first gear 6 and the second gear 10 in the vertical direction. Oil passages may be disposed in the bottom plate 90. The bottom plate 90 may also be of a predetermined width in the Z direction to maintain adequate spacing between the front plate 60 and back plate 70. A bottom surface 91 of the bottom plate 90 may be even or flush with a bottom surface 64 of the front plate 60 and a bottom surface 74 of the back plate 70. Even further, in some examples, the front plate 60 may be secured or fastened to the top plate 80 and the bottom plate 80 with rivets or the like, as discussed in more detail below. Similarly, the back plate 70 may be secured or fastened to the top plate 80 and the bottom plate 80 with rivets, bolts or the like, as discussed in more detail below.

Even further, in some implementations, the yolk assembly 50 may be mounted on a plurality of actuator rods 51. In some instances, an actuator rod 51 may be disposed through a first rod hole or bore 82 in the top plate 80. The first rod bore 82 may be through the width (Z) direction of the top plate 80 and may be threaded to correspond with threads 54 of the actuator rod 51. Similarly, another actuator rod 51 of the plurality of actuator rods may be disposed through a second rod hole or bore 83 in the top plate 80. The second rod bore 83 may be through the width (Z) direction of the top plate 80 and may be threaded to correspond with respective threads of the actuator rod 51. The first rod bore 82 and the second rod bore 83 of the top plate 80 may be disposed on either ends of the top plate 80 in the X direction.

In some instances, an actuator rod 51 may be disposed through a first rod hole or bore 92 in the bottom plate 90. The first rod bore 92 may be through the width (Z) direction of the bottom plate 90 and may be threaded to correspond with respective threads of the actuator rod 51. Similarly, another actuator rod 51 of the plurality of actuator rods may be disposed through a second rod hole or bore 93 in the bottom plate 90. The second rod bore 93 may be through the width (Z) direction of the bottom plate 90 and may be threaded to correspond with respective threads of the actuator rod 51. The first rod bore 92 and the second rod bore 93 of the bottom plate 90 may be disposed on either ends of the bottom plate in the X direction. Accordingly, in some instances four actuator rods 51 may support the yolk assembly 50 and may be parallel with each other and parallel to the axes of the first shaft 8 and second shaft 12.

In some implementations, and as mentioned above, each of the actuator rods 51 has a threaded portion 54, which is explained below, that is threaded into respective portions of the yolk assembly 50, such as the top plate 80 and bottom plate 90, as shown in FIG. 2. Further, respective back ends 53 of the actuator rods may be fitted with sprockets 110. The sprockets 110 may accommodate a sprocket chain 120, which may be in a loop engaged around each of the sprockets 110, for example.

Even further, in some examples, one of the actuator rods 52 has a member 58 extending in the Z direction through the face plate 36. Further, the actuator rod member 58 may be fitted with a crank handle 38 that when cranked drives rotation of the actuator rod 52. In some examples, the crank handle 38 is ten inches.

Accordingly, in some implementations, turning the crank handle 38 causes the actuator rod 52 having the member 58 to rotate thereby driving the sprocket 110 on the back end 53 of the actuator rod 52. In turn, rotating said sprocket 110 drives the sprocket chain 120 thereby driving the other sprockets 110. This causes the other actuator rods 51 to rotate. As the actuator rods 51 rotate, the top plate 80 and bottom plate 90 move in the axial direction along the length of the threads of the actuator rods 51 according to the turning direction the crank handle 38. This causes the front plate 60 and back plate 70 to move along with the top plate 80 and bottom plate 90, which effectively causes movement of the first gear 6 and the second gear 10 along the axial directions of the first shaft 8 and second shaft 12, respectively. This axial movement causes the first shaft 8 and second shaft 12 to rotate (due to the engagement of the respective splines, as explained above) thereby respectively causing the first drive shaft 4 and second drive shaft 5 to rotate relative to one another causing the phase shift. So, when the crank handle

38 is turned, the actuator rods 51 move together essentially synchronously and evenly to force the yolk assembly 50 to move evenly.

Accordingly, since the first shaft 8 and the second shaft 12 are connected to the vibrating screen(s)' 2 unbalanced shafts (and/or weights) via the respective first drive shaft 4 and second drive shaft 5, this causes the phase angle between the two (or more) unbalanced shafts (and/or weights) to move from 90 degree stroke or vertical stroke position to the 0 degree stroke or horizontal stroke position. Additionally, when in use, driving of the first gear 6 (and second gear 10) by the drive motor does not cause the axial position of the gears 6, 10 to change along their respective shafts 4, 5.

Additionally, in some implementations, an indicator pin or cylindrical rod 40 may be disposed on the yolk assembly 50. For example, the indicator pin 40 may extend off the top plate in the Z direction and extend through the front plate 60 and the face plate 36. The indicator pin 40 may be used to indicate how much the phase angle has been adjusted. Additionally, there may be a gap between the front face 65 of the front plate 60 and the face plate 36. This gap will change as the crank handle 38 is rotated.

Figure 3:
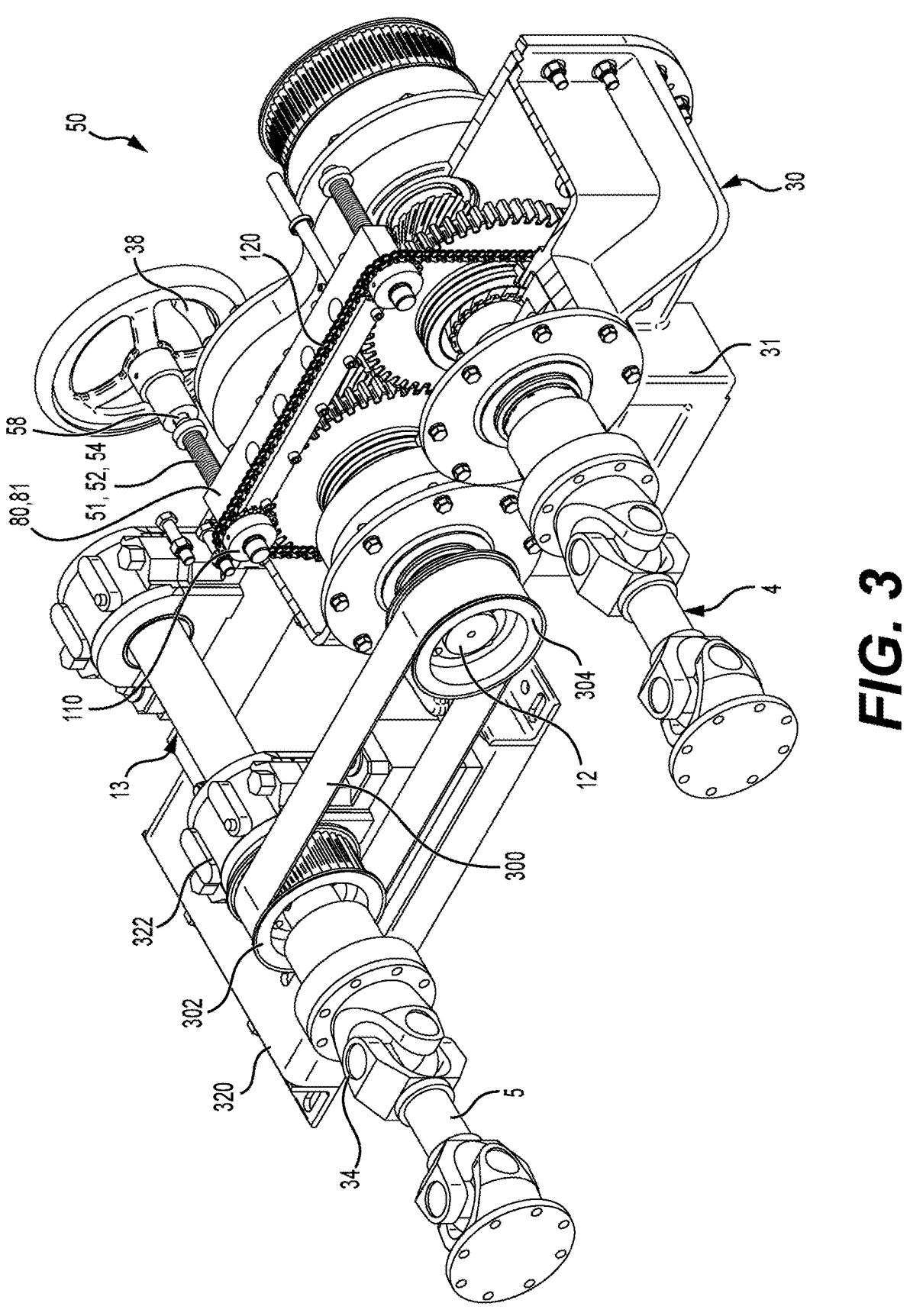
FIG. 3 is a cutaway view showing elements of the elliptical drive according to some implementations.

FIG. 3 is a cutaway view showing elements of the elliptical drive 1 according to some implementations. For example, some elements, such as the front plate 60 and back plate 70 are not shown in the view of FIG. 4. As shown, the housing 30 may contain elements of the yolk assembly 50. This view also shows the crank handle 38 connected to the member 58 of the actuator rod 52. In some implementations, the sprockets 110 are respectively attached to the actuator rods 51 that are disposed through the top plate 80 and each sprocket 110 may be disposed such that a portion of the sprocket chain 120 is disposed above a top surface 81 of the top plate 80. As shown, the sprockets 110 may be essentially cylindrical and respective outer surfaces thereof engage with the sprocket chain 120.

Further, a drive pulley 304 may be disposed on a rear end of the second shaft 12 which is aligned in the axial and vertical direction with drive pulley 302 disposed on a rear portion of the third shaft 13. The belt 300 may engage with the drive pulley 302 and 304 to transfer rotational force and maintain the phase angle between the two shafts from the second shaft 12 to the third shaft 13.

In some implementations, the third shaft 13 is supported by a support base 320. The support base 320 may be supported by the base 250 of the elliptical drive by one or more vertical legs 251. The support base 320 may be independent of a base structure, such as base structure 31, that supports the housing 30 and related elements contained within the housing. Even further, the third shaft 13 may be supported by one or more mounted bearings 322.

Figure 4:
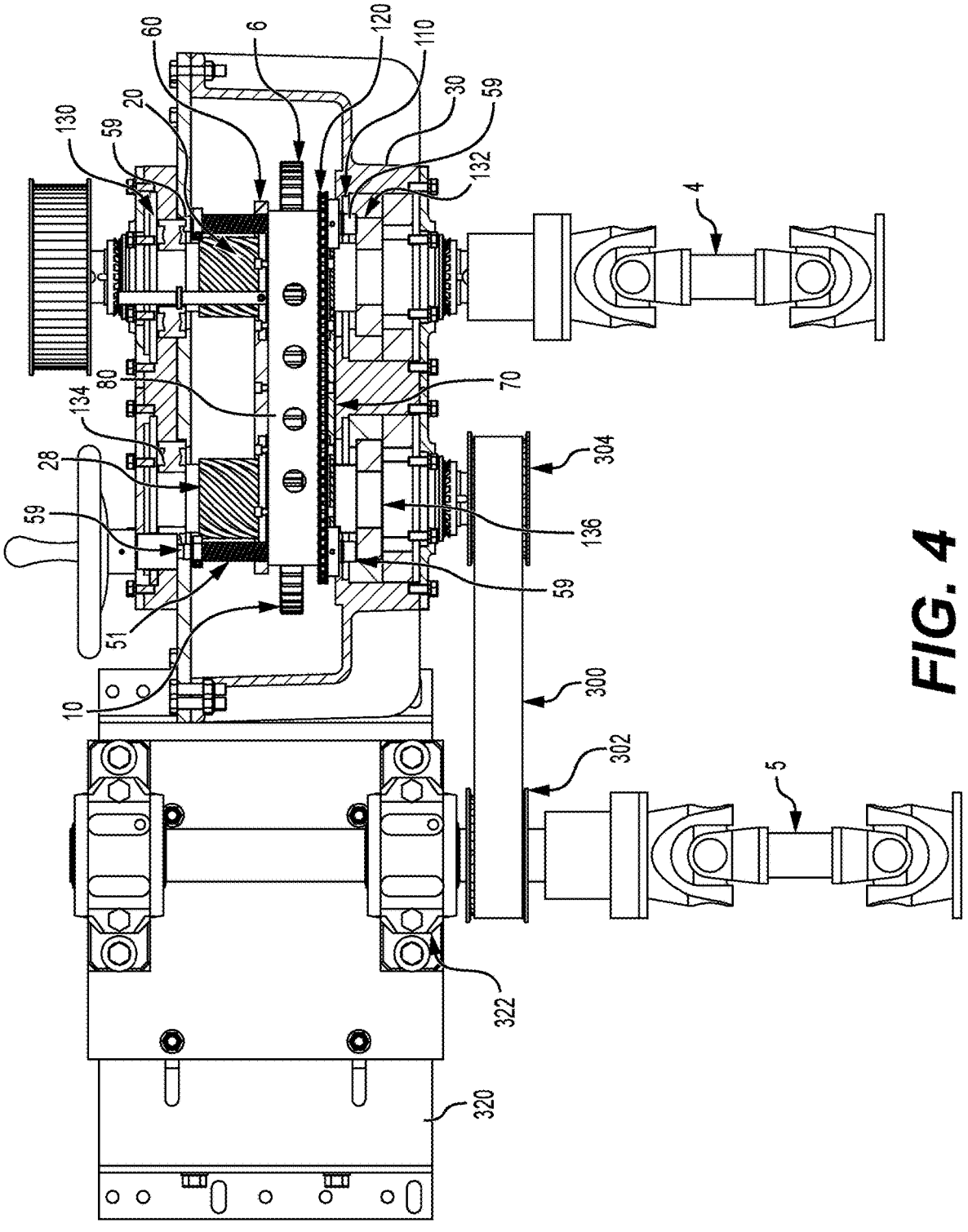
FIG. 4 shows a top down view of the cutaway portion shown in FIG. 3, according to some implementations

FIG. 4 shows a top down view of the cutaway portion shown in FIG. 3, according to some implementations. FIG. 4 shows further shows the first rear bearing 102 that interfaces with the hub 16 of the first gear 6. Accordingly, the first rear bearing 102 is coaxial with respect to the first hole 71 of the back plate 70. Also, in some implementations there is more than one bearing in addition to the first rear bearing 102. FIG. 4 further shows the second rear bearing 106 that interfaces with the hub 24 of the second gear 10. Accordingly, the second rear bearing 106 is coaxial with respect to the second hole 72 of the back plate 70. FIG. 4 also shows the rods rotate on brass flanged bushings 59 on each end of the rods and are inside bores in face plate 36 and housing 30, which is explained in more detail below.

FIG. 4 also shows first front plate bearing 130 and first rear housing bearing 132 that support the first shaft 8.

Further, FIG. 4 shows second front plate bearing 134 and second rear housing bearing 136 that support the second shaft 12.

Figure 5:
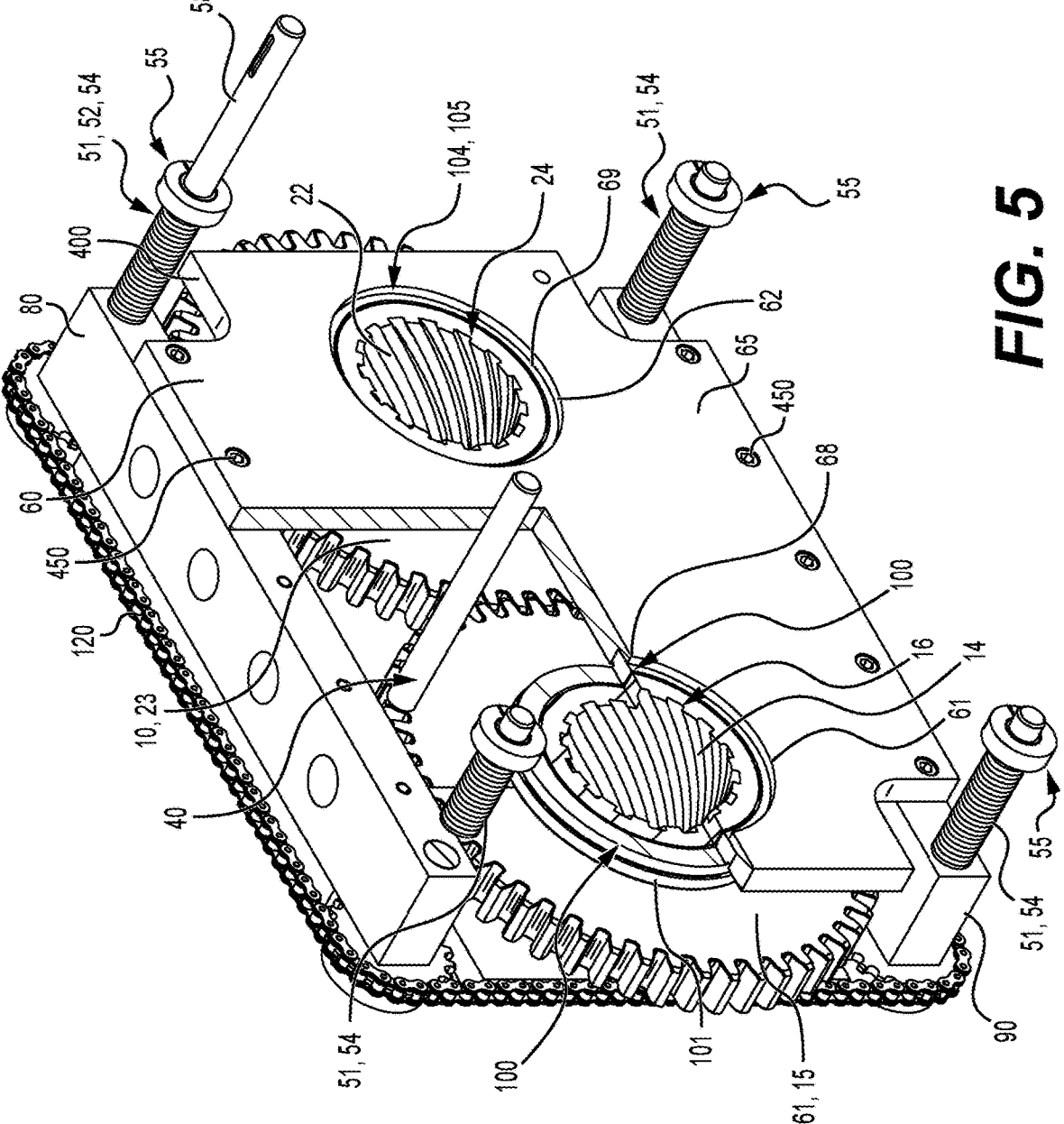
FIG. 5 is a partial isolated view of the yoke assembly according to some implementations.

FIG. 5 is a partial isolated view of the yoke assembly 50 according to some implementations. In FIG. 5 a portion of the front plate 60 is cutaway. FIG. 5 shows hub 16 of the first gear 6 having the helical internal splines 14. FIG. 5 also shows first front bearing 100 disposed around the hub 16. In some implementations, the first front bearing 100 may engage with a first recessed portion 68 that is recessed into a portion of the rear face 67 of the front plate 60 around a circumference of the first hole 61. In other words, the recessed portion 68 may be a circular cutout portion of the rear face 67 of the front plate 60. In some implementations, the recessed portion 68 may be a rim, edge or lip that accommodates the first front bearing 100. The first hole or bore 61 may be a stepped bore. Accordingly, a portion of the first front bearing 100 may sit in and engage with the recessed portion 68, as shown. Further each bearing 100, 102, 104 and 106 may have a center rotary ball bearing with two outer plates that are thrust plates that allow for rotary forces as well as axial forces. For example, FIG. 5 shows an outer plate 101 of the first front bearing 102.

FIG. 5 also shows hub 24 of the second gear 10 having the helical internal splines 22 and second front bearing 104 disposed around the hub 24. In some implementations, the second front bearing 104 may engage with a second recessed portion 69 that is recessed into a portion of the rear face 67 of the front plate 60 around a circumference of the second hole 62. Similarity, the recessed portion 69 may be a circular cutout portion of the rear face 67 of the front plate 60. In some implementations, the recessed portion 69 may be a rim, edge or lip that accommodates the second front bearing 104. The second hole or bore 62 may be a stepped bore. Accordingly, a portion of the second front bearing 104 may sit in and engage with the recessed portion 66, as shown. For example, FIG. 5 shows an outer plate 103 of the second front bearing 104.

Although not shown in FIG. 5, the first hole 71 and the second hole 72 of the back plate 70 may also engage with hub 16 and hub 24, respectively in a similar manner. For example, the first hole 71 may have a first recessed portion. In some implementations, the first rear bearing 102 may engage with the first recessed portion that is recessed into a portion of the front face 75 of the back plate 70 around a circumference of the first hole 71. In other words, the first recessed portion may be a circular cutout portion of the front face 75 of the back plate 70. In some implementations, the first recessed portion may be a rim, edge or lip that accommodates the first rear bearing 102. Accordingly, a portion of the first rear bearing 102 may sit in and engage with the first recessed portion 76.

Likewise, in some implementations, the second rear bearing 106 may engage with a second recessed portion that is recessed into a portion of the front face 75 of the back plate 70 around a circumference of the second hole 72. The second recessed portion may be a circular cutout portion of the front face 75 of the back plate 70. In some implementations, the second recessed portion may be a rim, edge or lip that accommodates the second rear bearing 106. Accordingly, a portion of the second rear bearing 106 may sit in and engage with the second recessed portion.

Figure 6:
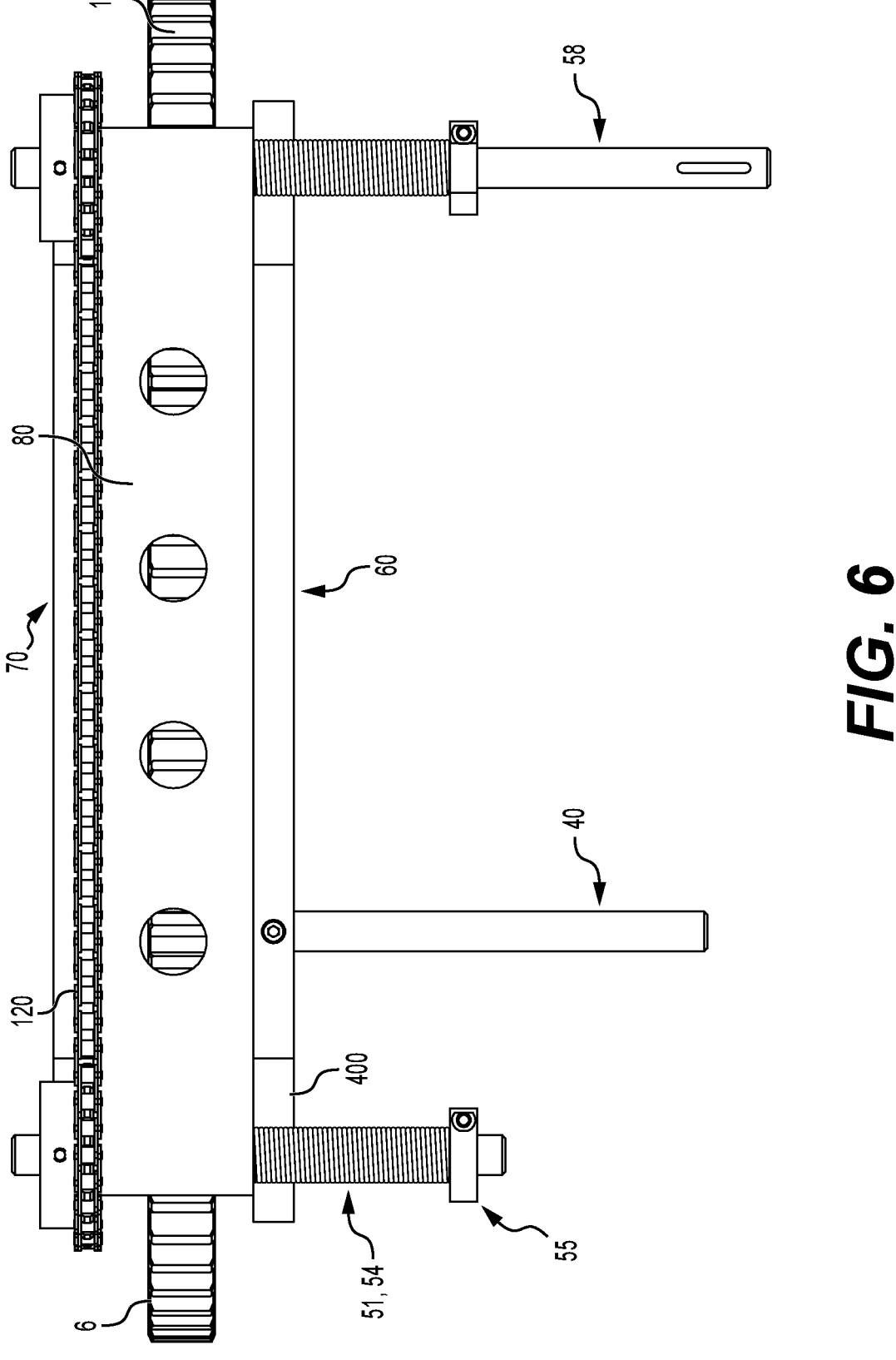
FIG. 6 is a top view of a portion of the yoke assembly according to some implementations.

FIG. 6 is a top view of a portion of the yoke assembly 50 according to some implementations. FIGS. 5 and 6 show that in some examples, the front plate 60 and back plate 70 may have one or more passages, such as passage 400 in front plate 60, so that the actuator rods 51 do not contact the front plate 60 (or back plate 70). The passages 400 may be disposed in the edge, side, or corners of the front plate 60 and/or back plate 70.

FIGS. 5 and 6 further show rivets 450, bolts, screws, pins or the like disposed along top and bottom edges of the front plate 60 that attach the front plate 60 to the top plate 80 and back plate 90, respectively. Although not shown in FIG. 5, similar rivets may be disposed along top and bottom edges of the back plate 70 that attach the back plate 70 to the top plate 80 and bottom plate 90, respectively. FIGS. 5 and 6 also shows threaded portions 54 of each actuator rod 51. Additionally, FIG. 5 shows collars 55 disposed on each actuator rod 51. The collars 55 may be split collars to maintain the axial position of the actuator rods 51.

Figure 7:
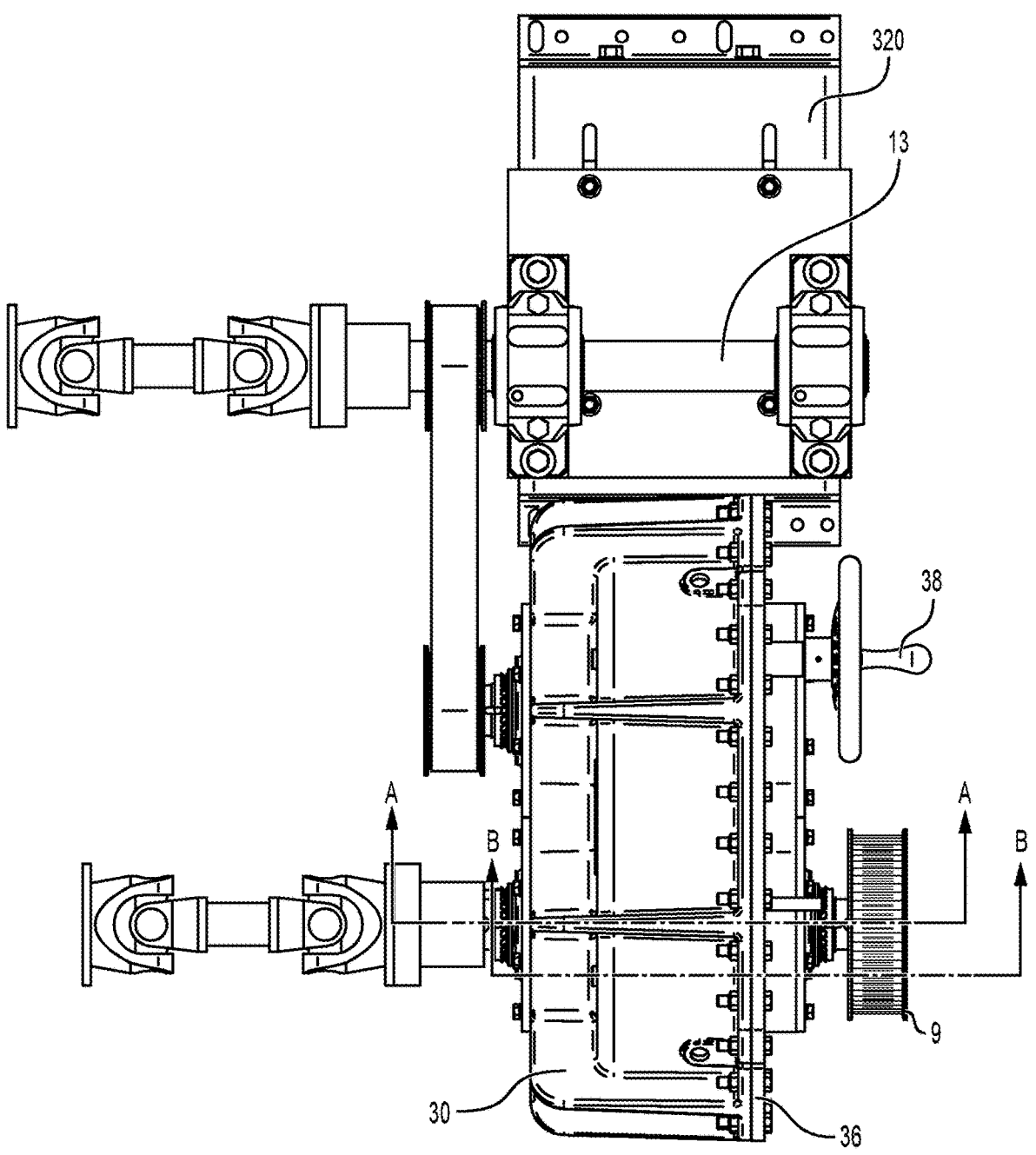
FIG. 7 shows the elliptical drive and components of the yolk assembly enclosed within a housing according to some implementations.

FIG. 7 shows the elliptical drive 1 and components of the yolk assembly 50 enclosed within housing 30 according to some implementations. For example, FIG. 7 shows the housing 30 connected to face plate 36 with bolts or the like. FIG. 7 further shows the crank handle 38, drive pulley 9 disposed outside of the face plate 36. FIG. 7 also shows the third shaft 13 disposed on the support base of the third shaft 320. Some components are not described here for the sake of brevity since they are described above.

Figure 8:
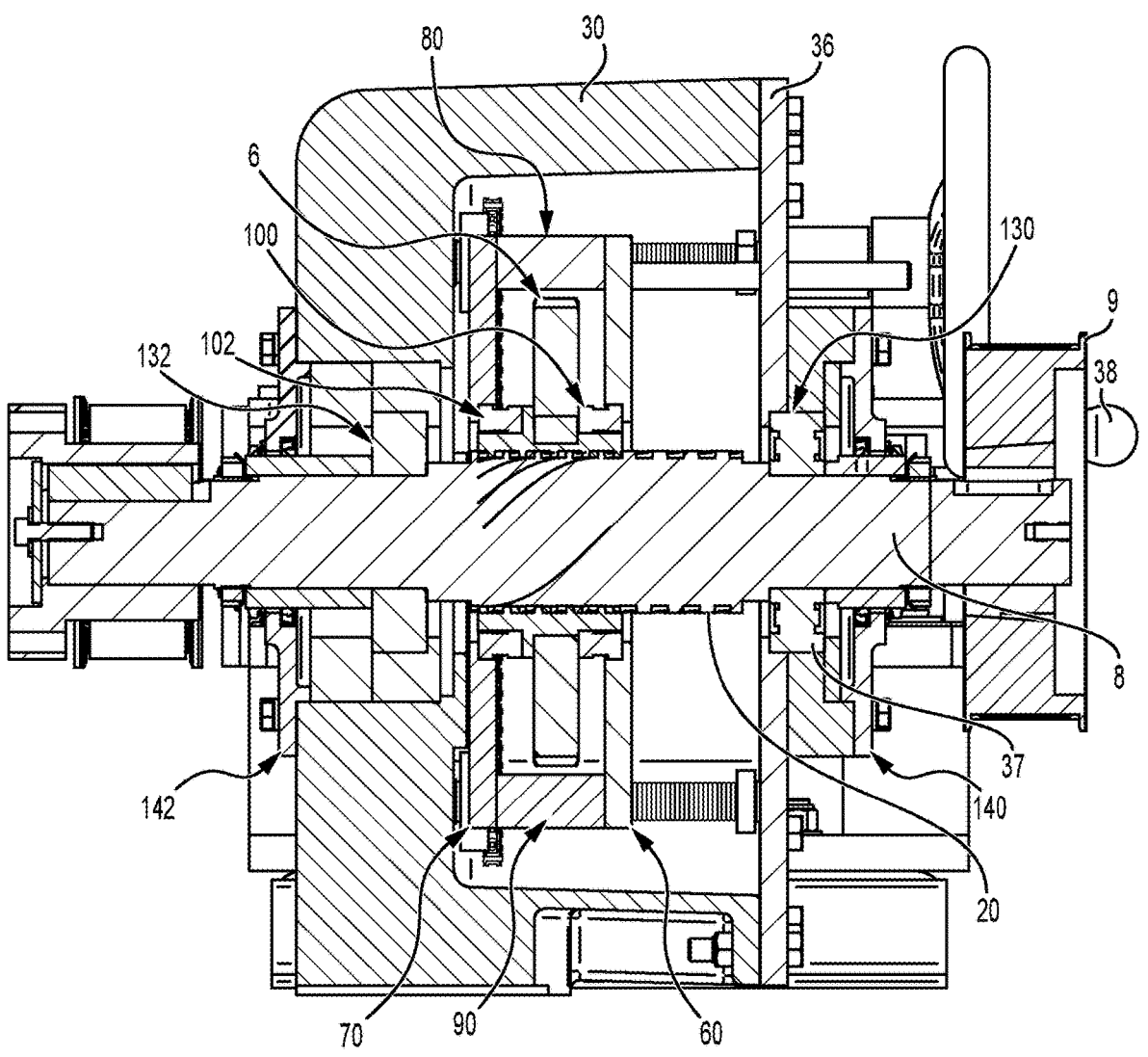
FIG. 8 is a cross-sectional view along A-A of FIG. 7 according to some implementations.

FIG. 8 is a cross-sectional view along A-A of FIG. 7 according to some implementations. FIG. 8 shows first front plate bearing 130 disposed in a first bore of face plate 37. The first front plate bearing 130 may support the first shaft 8. The first bore of face plate 37 may be a stepped bore. Drive pulley 9 is also shown fitted to the end portion of first shaft 8. As shown, a portion (e.g., helical section 20) of first shaft 8 may have a greater diameter than other portions of the first shaft 8 such as at the end portion where the drive pulley 9 is fitted or the other end. Additionally, FIG. 8 also shows a rear housing bearing 132 disposed in a bore of housing 30 to support first shaft 8.

FIG. 8 also shows a first front seal plate 140 disposed around an end portion of first shaft 8 and a rear seal plate 142 disposed around a rear portion of the first shaft 8. Both seal plates 140, 142 are connected to the housing 30 via bolts or the like.

Similarly, although not shown in the view of FIG. 8, but shown in FIG. 4, a second front plate bearing 134 may be disposed in a second bore of face plate 35. The second front plate bearing 134 may support the second shaft 12. The second bore of face plate 35 may be a stepped bore. Further, a portion (e.g., helical section 28) of second shaft 12 may have a greater diameter than other portions of the second shaft. Additionally, a second rear housing bearing 136 may be disposed in a bore of housing 30 to support second shaft 12.

Further, although not shown in the view of FIG. 8, a second front seal plate may be disposed around an end portion of second shaft 12 and a second rear seal plate may disposed around a rear portion of the second shaft 12. Both second seal plates may also be connected to the housing 30 via bolts or the like.

Figure 9:
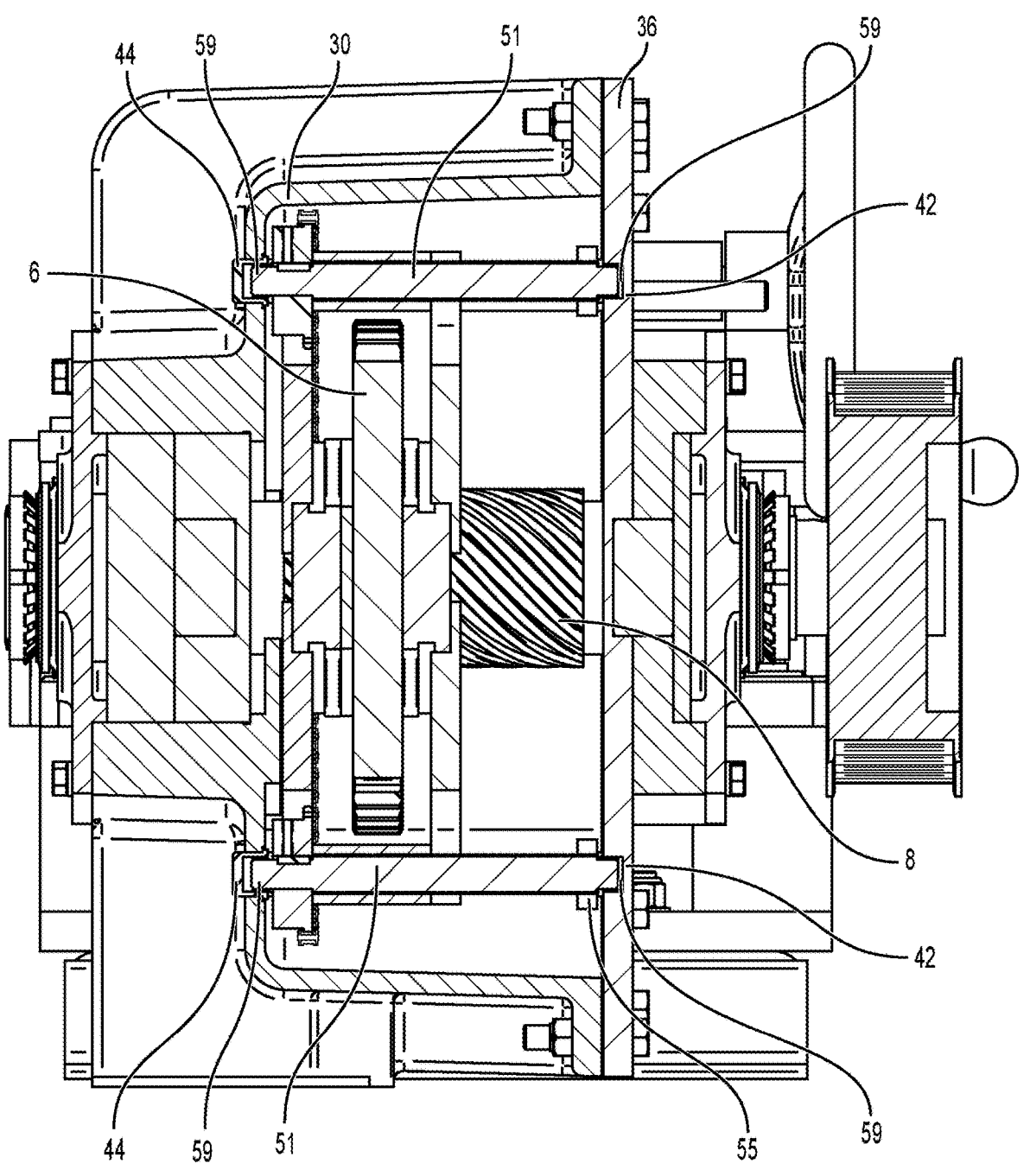
FIG. 9 is a cross-sectional view along B-B of FIG. 7 according to some implementations.

FIG. 9 is a cross-sectional view along B-B of FIG. 7 according to some implementations. For example, FIG. 9 shows first shaft 8, housing 30 and face plate 36. FIG. 7 also shows two of the actuator pins 51. Brass step flange bushings 59 may be disposed on each end of each actuator pin 51. The face plate 36 may also have bores 42 for the brass step flange bushings 59. Further, the housing 30 may have bores 44 for the brass step flange bushings 59.

Additionally, the elliptical drive 1 described above can be applied to three or more shaft vibrating screens as well whereby the other main shafts would be driven or tied together with belts.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. An elliptical drive device, comprising:
a first shaft having first helical external splines;
a second shaft, disposed parallel to the first shaft, having second helical external splines;
a first gear having a first hub with first helical internal splines that mate with the first helical external splines of the first shaft;
a second gear intermeshed with the first gear and having a second hub with second helical internal splines that mate with the second helical external splines of the second shaft;
a first drive shaft coupled to the first shaft;
a third shaft disposed parallel to the second shaft;
a second drive shaft, disposed parallel to the first drive shaft, coupled to the third shaft;
a belt connecting the second shaft with the third shaft;
a top plate disposed above the first gear and the second gear;
a first threaded actuator rod disposed through the top plate;
a front plate and a back plate sandwiching the first gear and the second gear in an axial direction of the first shaft and second shaft; and
a bottom plate sandwiching the first gear and the second gear with the top plate in a vertical direction that is orthogonal to the axial direction,
wherein upon rotation of the first threaded actuator rod, the top plate, bottom plate, front plate and back plate move together in the axial direction causing relative rotation of the first shaft and second shaft with respect to each other.

2. The elliptical drive device of claim 1,
wherein the front plate is secured to the top plate and the bottom plate, and
wherein the back plate is secured to the top plate and the bottom plate.

3. The elliptical drive device of claim 1, further comprising:
a plurality of threaded actuator rods including the first actuator rod,
wherein the first threaded actuator rod and at least one other of the plurality of threaded actuator rods are disposed in the top plate,
wherein at least two other threaded actuator rods of the plurality of threaded actuator rods are disposed in the bottom plate, and
wherein each of the plurality of threaded actuator rods are disposed parallel to an axes of the first shaft and the second shaft.

4. The elliptical drive device of claim 3, further comprising:
a plurality of sprockets respectively disposed on each of the plurality of threaded actuator rods; and
a chain disposed in a loop engaging each of the plurality of sprockets.

5. The elliptical drive device of claim 4, wherein upon rotation of the first threaded actuator rod, each of the sprockets and threaded actuator rods rotate thereby causing the top plate, bottom plate, front plate and back plate to move in the axial direction.

6. The elliptical drive device of claim 1, further comprising:

a first bearing disposed on the first hub of the first gear;

a second bearing disposed on the first hub of the first gear;

a third bearing disposed on the second hub of the second gear; and a fourth bearing disposed on the second hub of the second gear, wherein the front plate is disposed on the first bearing and the third bearing, and wherein the back plate is disposed on the second bearing and the fourth bearing.

7. The elliptical drive device of claim 1, further comprising:

a housing that houses at least the first gear, the second gear, and the front plate, wherein the first threaded actuator rod has a member extending in the axial direction and has a distal end outside of the housing.

8. The elliptical drive device of claim 1, further comprising:

a housing that houses at least the first gear, the second gear, and the front plate; and a pin disposed on the top plate that extends in the axial direction and has a distal end outside of the housing.

9. The elliptical drive device of claim 1, further comprising:

a housing that houses at least the first gear, the second gear, and the front plate; and a drive pulley outside of the housing that is disposed on the first shaft.

10. The elliptical drive device of claim 1, wherein a length, in the axial direction, of a first helical section of the first shaft, which includes the first helical external splines, is longer than an axial length of the first hub of the first gear, and wherein a length, in the axial direction, of a second helical section of the second shaft, which includes the second helical external splines, is longer than an axial length of the second hub of the second gear.

11. A method of adjusting a vibrating mechanism of a vibrating screen, the method comprising:

providing a first shaft having first helical external splines;

providing a second shaft, disposed parallel to the first shaft, having second helical external splines;

providing a first gear having a first hub with first helical internal splines that mate with the first helical external splines of the first shaft;

providing a second gear intermeshed with the first gear and having a second hub with second helical internal splines that mate with the second helical external splines of the second shaft;

providing a first drive shaft coupled to the first shaft;

providing a third shaft disposed parallel to the second shaft;

providing a second drive shaft, disposed parallel to the first drive shaft, coupled to the third shaft;

providing a belt connecting the second shaft with the third shaft;

providing a top plate disposed above the first gear and the second gear;

providing a first threaded actuator rod disposed through the top plate;

providing a front plate and a back plate sandwiching the first gear and the second gear in an axial direction of the first shaft and second shaft;

providing a bottom plate sandwiching the first gear and the second gear with the top plate in a vertical direction that is orthogonal to the axial direction; and rotating the first threaded actuator rod thereby causing the top plate, bottom plate, front plate and back plate to move together in the axial direction causing relative rotation of the first shaft and second shaft with respect to each other.

12. The method of adjusting a vibrating mechanism of claim 11, further comprising:

securing the front plate to the top plate and the bottom plate; and securing the back plate to the top plate and the bottom plate.

13. The method of adjusting a vibrating mechanism of claim 11, further comprising:

providing a plurality of threaded actuator rods including the first actuator rod;

disposing the first threaded actuator rod and at least one other of the plurality of threaded actuator rods in the top plate;

disposing at least two other threaded actuator rods of the plurality of threaded actuator rods are disposed in the bottom plate; and disposing each of the plurality of threaded actuator rods are parallel to an axes of the first shaft and the second shaft.

14. The method of adjusting a vibrating mechanism of claim 13, further comprising:

providing a plurality of sprockets respectively disposed on each of the plurality of threaded actuator rods; and disposing a chain in a loop around each of the plurality of sprockets.

15. The method of adjusting a vibrating mechanism of claim 14, wherein upon rotation of the first threaded actuator rod, each of the sprockets and threaded actuator rods rotate thereby causing the top plate, bottom plate, front plate and back plate to move in the axial direction.

16. The method of adjusting a vibrating mechanism of claim 11, further comprising:

disposing a first bearing on the first hub of the first gear;

disposing a second bearing on the first hub of the first gear;

disposing a third bearing on the second hub of the second gear;

disposing a fourth bearing on the second hub of the second gear;

disposing the front plate on the first bearing and the third bearing; and disposing the back plate on the second bearing and the fourth bearing.

17. The method of adjusting a vibrating mechanism of claim 11, further comprising:

providing a housing that houses at least the first gear, the second gear, and the front plate; and providing a member, on the first threaded actuator rod, that extends in the axial direction and that has a distal end outside of the housing.

18. The method of adjusting a vibrating mechanism of claim 11, further comprising:

providing a housing that houses at least the first gear, the second gear, and the front plate; and disposing a pin on the top plate that extends in the axial direction that has a distal end outside of the housing.

19. The method of adjusting a vibrating mechanism of claim 11, further comprising:

providing a housing that houses at least the first gear, the second gear, and the front plate; and disposing a drive pulley on the first shaft outside of the housing.

20. The method of adjusting a vibrating mechanism of claim 11, wherein a length, in the axial direction, of a first helical section of the first shaft, which includes the first helical external splines, is longer than an axial length of the first hub of the first gear, and wherein a length, in the axial direction, of a second helical section of the second shaft, which includes the second helical external splines, is longer than an axial length of the second hub of the second gear.

\* \* \* \* \*